United States Patent [19]

Reber et al.

[11] 4,218,194
[45] Aug. 19, 1980

[54] VAPOR PRESSURE CONTROL SYSTEM FOR GAS TURBINE FUEL

[75] Inventors: Martin R. Reber; Leland G. Kitchen, both of Bartlesville, Okla.

[73] Assignee: Phillips Petroleum Company, Bartlesville, Okla.

[21] Appl. No.: 945,713

[22] Filed: Sep. 25, 1978

[51] Int. Cl.² .................. F04B 17/00; F02C 3/24
[52] U.S. Cl. ................. 417/364; 60/39.02; 60/39.46 P
[58] Field of Search ........... 60/39.02, 39.09 R, 39.1, 60/39.46 R, 39.46 P; 417/364, 380, 34

[56] References Cited

U.S. PATENT DOCUMENTS

| | | | |
|---|---|---|---|
| 2,681,694 | 6/1954 | Loft | 60/39.46 P |
| 2,768,496 | 10/1956 | Stamm et al. | 60/39.46 P |
| 3,022,425 | 2/1962 | Rockstead | 60/39.46 P |
| 3,656,872 | 4/1972 | Tubb | 417/364 |

Primary Examiner—Louis J. Casaregola

[57] ABSTRACT

A control system is provided to prevent flashing of crude oil fuel at the burner nozzles of a combustion gas turbine. The discharge pressure of the combustion gas turbine air compressor is monitored to determine if the combustion gas turbine is operating in a potentially nozzle-flashing manner. If the combustion gas turbine system is operating in a potentially nozzle-flashing manner then the vapor pressure of the crude oil fuel to the combustion gas turbine is lowered. If no potential for nozzle flashing exists, then the vapor pressure of the crude oil fuel can remain at a higher level. Control of the vapor pressure of the crude oil fuel in response to the combustion gas turbine air compressor discharge pressure provides maximum use of the crude oil as fuel while minimizing the venting of light hydrocarbons from the crude oil fuel to reduce the vapor pressure of the crude fuel oil.

33 Claims, 3 Drawing Figures

VAPOR PRESSURE CONTROL SYSTEM FOR GAS TURBINE FUEL

This invention relates to a fuel supply system for a combustion gas turbine. In a particular aspect this invention relates to method and apparatus for controlling the vapor pressure of crude oil supplied as fuel to a combustion gas turbine. In another particular aspect, this invention relates to method and apparatus for maximizing the use of crude oil as fuel while minimizing the venting of light hydrocarbons necessary to provide a crude oil fuel, having an acceptable vapor pressure, to a combustion gas turbine.

The transportation of crude oil in the petroleum industry by long distance pipelines is widespread. Because of the pressure drop along the pipeline due to the friction between the liquid and the pipe, it is necessary to utilize pumping stations positioned along the line in order to boost the pressure from station to station along the line. Combustion gas turbines are commonly used to power the booster pumps in the pumping stations.

It is highly desirable to use the crude oil being transported as fuel for the combustion gas turbines. It is essential in systems which use the crude oil as fuel for the combustion gas turbines that there be no flashing of the crude oil at the inlet of the combustion gas turbine burner nozzles. Flashing can be prevented by maintaining the vapor pressure of the crude oil fuel at a level lower than the combustion gas turbine air compressor discharge pressure.

It is thus an object of this invention to provide method and apparatus for controlling the vapor pressure of crude oil supplied as fuel to a combustion gas turbine. It is a second object of this invention to provide method and apparatus for maximizing the use of crude oil as fuel for a combustion gas turbine while minimizing the venting of light hydrocarbons necessary to provide a crude oil fuel having an acceptable vapor pressure to a combustion gas turbine.

In accordance with the present invention method and apparatus is provided whereby the combustion gas turbine air compressor discharge pressure is monitored to provide an indication of the maximum allowable vapor pressure of the crude oil fuel. If the combustion gas turbine air compressor discharge pressure is at a normal operating level, then the vapor pressure of the crude oil fuel is maintained at a level slightly below the normal operating level of the combustion gas turbine air compressor discharge pressure. If the combustion gas turbine air compressor discharge pressure is below a normal operating level, then the vapor pressure of the crude oil fuel is maintained at a level below the minimum combustion gas turbine air compressor discharge pressure. Standby diesel fuel will be used only during startup of the combustion gas turbines and during periods when the crude oil fuel is not at an acceptable vapor pressure. In this manner use of the crude oil as fuel for the combustion gas turbines is maximized, flashing of the crude oil fuel at the inlet of the combustion gas turbine burner nozzles is prevented, and the venting of light hydrocarbons from the crude oil fuel to provide a crude oil fuel having an acceptable vapor pressure to the combustion gas turbine is minimized.

Other objects and advantages of the invention will be apparent from the detailed description of the invention and the appended claims as well as from the detailed description of the drawings in which:

Figure 1:
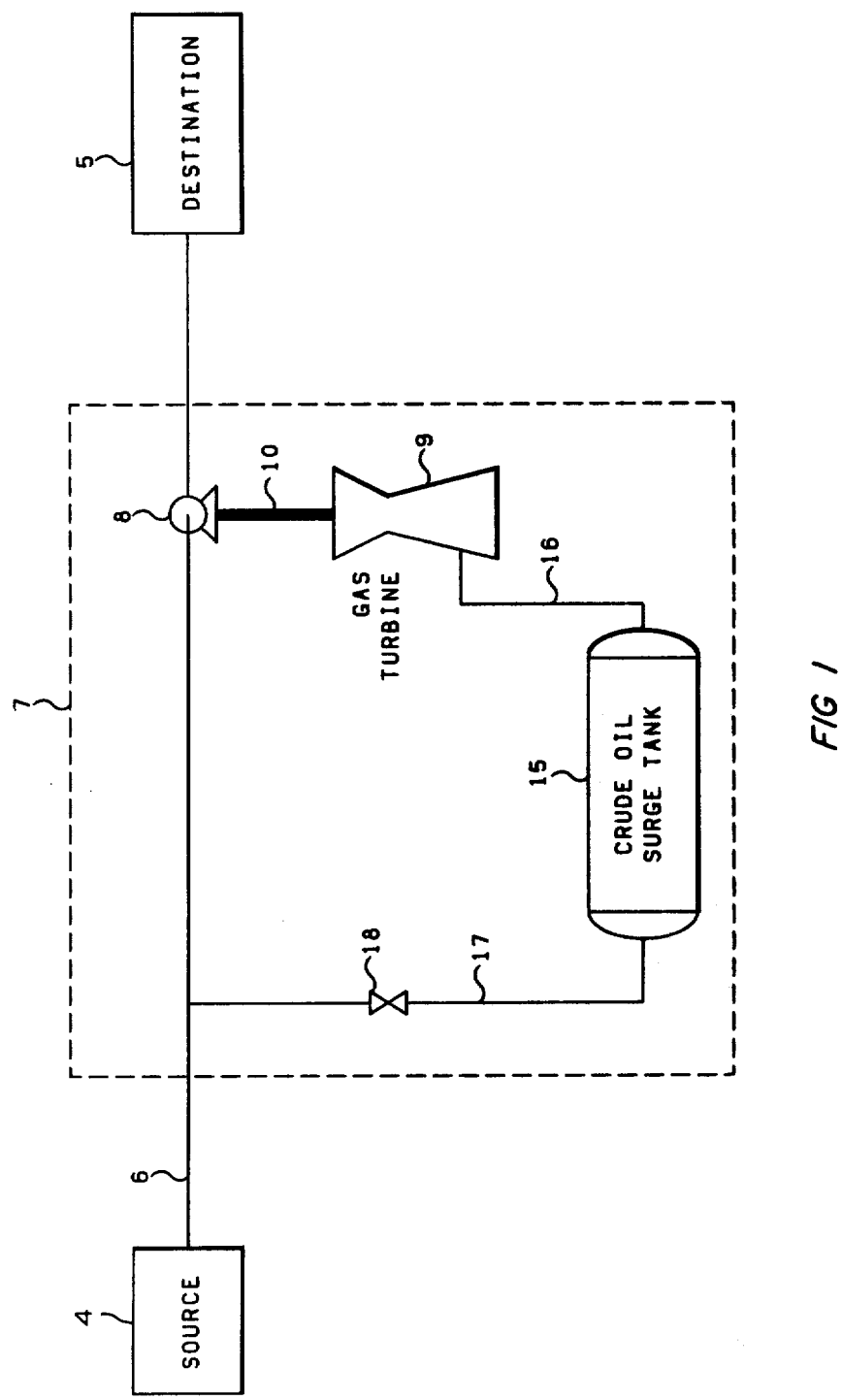
FIG. 1 is an illustration of a pumping station wherein a combustion gas turbine is used to drive the pumps.

The invention is illustrated and described in terms of a pumping station having three combustion gas turbines with interrelated control systems. The invention, however, is applicable to different numbers of combustion gas turbines, different fuel supply configurations, and different control system configurations capable of controlling the fuel supply system in accordance with the present invention.

Lines designated as signal lines in the drawings are electrical or pneumatic in this preferred embodiment. However, the invention is also applicable to mechanical, hydraulic, and other signal means for transmitting information. In almost all control systems some combination of these types of signals will be used. However, use of any other type of signal transmission, compatible with the process and equipment in use, is within the scope of the invention.

Figure 3:
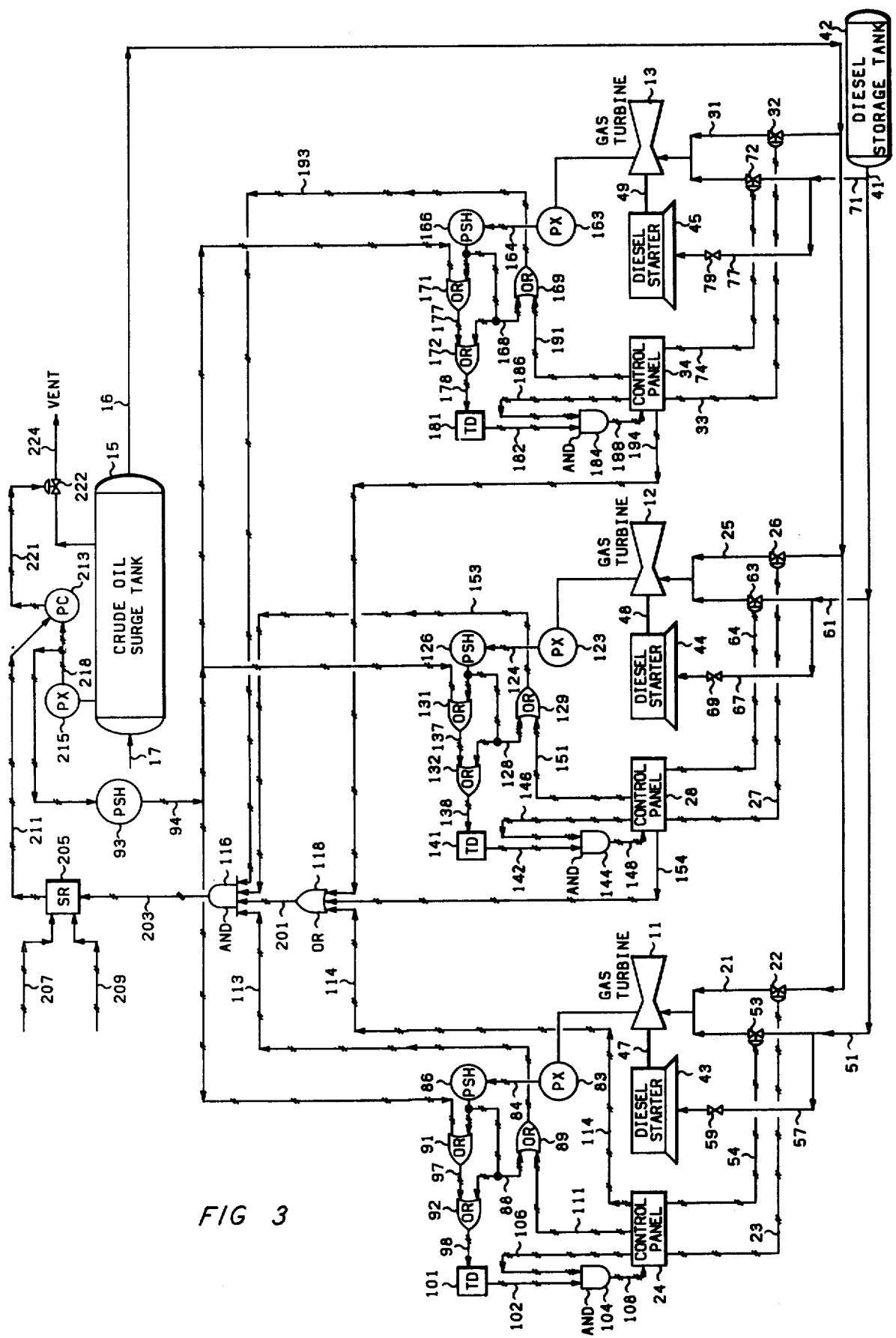
FIG. 3 is an illustration of a fuel supply system and an associated control system for three combustion gas turbines.

The controller illustrated in FIG. 3 may utilize the various modes of control such as proportional, proportional-integral, proportional-derivative, or proportional-integral-derivative. In this preferred embodiment a proportional-integral controller is utilized. The operation of this type of controller is well known in the art. The output control signal of a proportional-integral-controller may be represented as $$S = K_1 E + K_2 \int E \, dt$$

where
S = output control signal;
E = difference between two input signals; and
$K_1$ and $K_2$ = constants.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic control elements in conjunction with electrical signal handling and translation apparatus, the apparatus and method of the invention can be implemented using a variety of specific equipment available to and understood by those skilled in control art. Likewise, the format of the various signals can be modified substantially in order to accommodate signal format requirements of the particular installation, safety factors, the physical characteristics of the measuring or control instruments and other factors. For example, some measuring equipment will produce a measurement signal which is generally proportional to the square of the actual measured parameter. Other measuring equipment might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

The invention is described in terms of a combustion gas turbine system which has a normal operating combustion gas turbine air compressor discharge pressure of 79 psig and a minimum operating combustion gas turbine air compressor discharge pressure of 39 psig. The invention is, however, applicable to other combustion gas turbine systems having different operating characteristics.

Referring now to the drawings, and in particular to FIG. 1, there is illustrated a source 4 of crude oil and a destination 5 for the crude oil connected by a pipeline 6. A pumping station 7 is provided to boost the pressure in the pipeline 6.

A single pumping means 8 is illustrated in FIG. 1. The pumping means 8 is representative of the pumps that are used in the pumping station to boost the pressure in the pipeline 6. The pumping means 8 is driven by means of the combustion gas turbine 9 which is operably connected to the pumping means 8 by drive shaft 10.

Crude oil is supplied to the crude oil surge tank 15 through conduit means 17 which is operably connected to the crude oil pipeline 6. The flow of crude oil to the crude oil surge tank 15 through conduit means 17 is controlled by manipulating control valve 18.

Crude oil is supplied as fuel to the combustion gas turbine 9 through conduit means 16 from the crude oil surge tank. Thus the crude oil being transported through the pipeline 6 is utilized to provide fuel to the combustion gas turbine 9 which in turn provides power for the pumping means 8.

Figure 2:
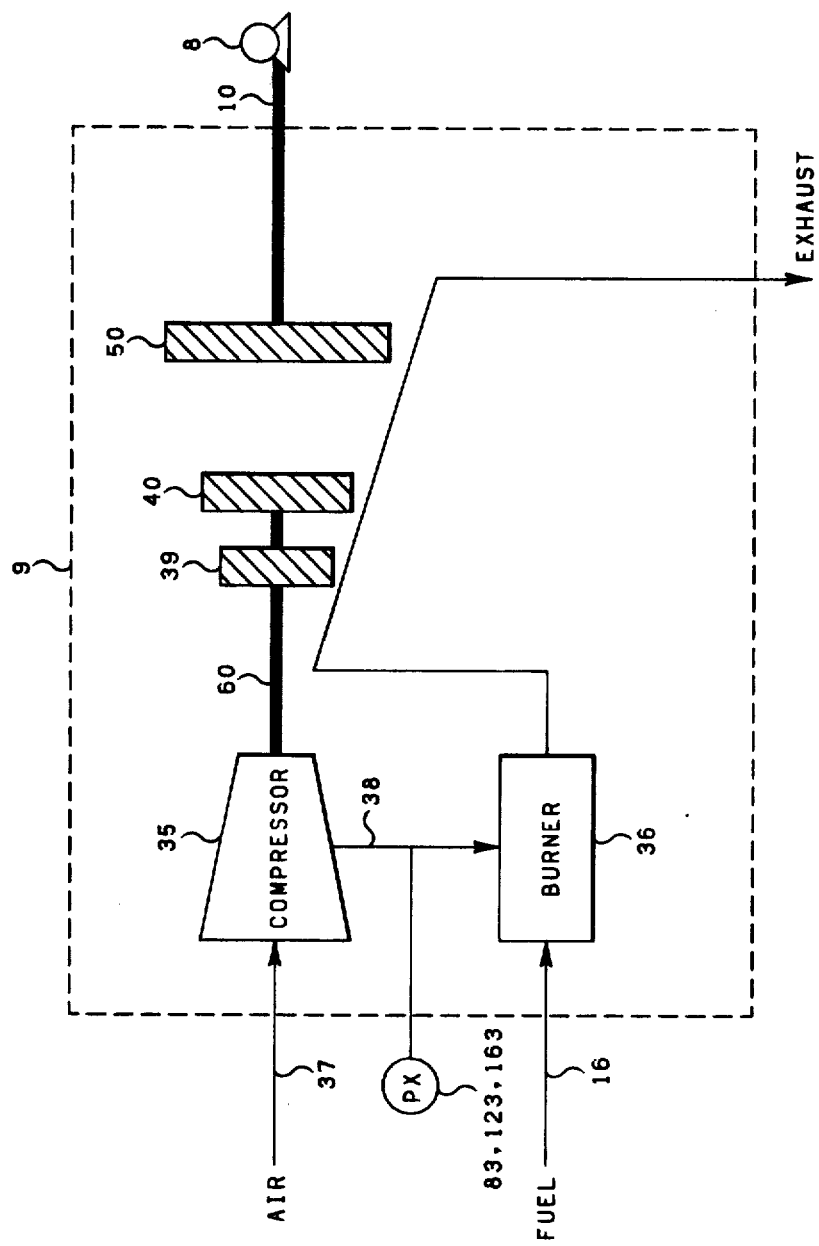
FIG. 2 is an illustration of a combustion gas turbine.

The combustion gas turbine 9, illustrated in FIG. 1, is more fully illustrated in FIG. 2. Referring now to FIG. 2, a combustion gas turbine having an air compressor 35 and a burner 36, is illustrated. Air is provided to the air compressor 35 through conduit means 37. Compressed air is supplied from the compressor 35 to the burner 36 through conduit means 38. The pressure of the air flowing through conduit means 38 is referred to as the combustion gas turbine air compressor discharge pressure and is the pressure measured by pressure transducers 83, 123 and 163 illustrated in FIG. 3.

Fuel is supplied to the burner 36 through conduit means 16 as illustrated in FIG. 1. The fuel is combusted to provide a flow of hot combustion gas across the turbine blades 39, 40 and 50. This flow of hot combustion gases acts to rotate the turbine blades 39, 40 and 50. The rotation of turbine blades 39 and 40, which are connected to the air compressor 35 by means of drive shaft 60, provides power for the air compressor 35. The rotation of turbine blade 50, which is connected to the pumping means 8 by means of drive shaft 10, as is illustrated in FIG. 1, provides power for the pumping means 8.

Referring now to FIG. 3 there is illustrated three combustion gas turbines 11, 12 and 13 which correspond to the combustion gas turbine 9 illustrated in FIGS. 1 and 2. The three combustion gas turbines each provide power for pumps in the pumping station 7 illustrated in FIG. 1. Crude oil fuel is supplied to the three combustion gas turbines 11, 12 and 13 from the crude oil surge tank 15 through conduit means 16. Crude oil fuel is supplied to combustion gas turbine 11 through conduit means 21 which is operably connected to conduit means 16. The flow of crude oil fuel to the combustion gas turbine 11 is controlled by means of pneumatic control valve 22 which is manipulated in response to control signal 23 which is generated by control panel 24. The control panel 24, and also control panels 28 and 34, are operator control panels. The control system is designed to light up certain lights on the control panels 24, 28 and 34 to indicate various operating conditions. In response to these system conditions the operator simply throws a switch which activates a control valve to thereby control which fuel is being provided to the combustion gas turbines 11, 12 and 13.

The crude oil fuel is supplied to combustion gas turbine 12 through conduit means 25 which is operably connected to conduit means 16. The flow of crude oil fuel through conduit means 25 to combustion gas turbine 12 is controlled by means of pneumatic control valve 26 which is located in conduit means 25. Pneumatic control valve 26 is manipulated in response to control signal 27 which is generated by the control panel 28. Crude oil fuel is supplied to the combustion gas turbine 13 through conduit means 31 which is operably connected to conduit means 16. The flow of the crude oil fuel through conduit means 31 to the combustion gas turbine 13 is controlled by means of pneumatic control valve 32 which is located in conduit means 31. Pneumatic control valve 32 is manipulated in response to control signal 33 which is generated by control panel 34.

Diesel fuel is used as a supplemental fuel for the combustion gas turbines 11, 12 and 13 and is also used as the fuel supply for the diesel starters 43, 44 and 45. The diesel starter 43 is connected to the combustion gas turbine 11 by means of drive shaft 47. The diesel starter 44 is connected to the combustion gas turbine 12 by means of drive shaft 48. The diesel starter 45 is connected to the combustion gas turbine 13 by means of drive shaft 49.

The main diesel fuel supply flows from storage tank 42 through conduit means 41. Diesel fuel is supplied to the combustion gas turbine 11 through conduit means 51 which is operably connected to conduit means 41. The flow of diesel fuel to the combustion gas turbine 11 is controlled by means of pneumatic control valve 53 which is located in conduit means 51. The pneumatic control valve 53 is manipulated in response to control signal 54 which is generated by the control panel 24. Diesel fuel is supplied to the diesel starter 43 through conduit means 57 which is operably connected to conduit means 51. The flow of diesel fuel to the diesel starter 43 is controlled by means of control valve 59.

Diesel fuel is supplied to the combustion gas turbine 12 through conduit means 61 which is operably connected to conduit means 41. The flow of diesel fuel through conduit means 61 to the combustion gas turbine 12 is controlled by means of control valve 63 which is located in conduit means 61. The pneumatic control valve 63 is manipulated in response to control signal 64 which is generated by the control panel 28. Diesel fuel is supplied to the diesel starter through conduit means 67 which is operably connected to conduit means 61. The flow of diesel fuel through conduit means 67 to the diesel starter 44 is controlled by means of control valve 69.

Diesel fuel is supplied to combustion gas turbine 13 through conduit means 71 which is operably connected to conduit means 41. The flow of diesel fuel through conduit means 71 is controlled by means of pneumatic control valve 72. Pneumatic control valve 72 is manipulated in response to control signal 74 which is generated by the control panel 34. Diesel fuel is supplied to the diesel starter 45 through conduit means 77 which is operably connected to conduit means 71. The flow of diesel fuel through conduit means 77 is controlled by means of control valve 79.

The control system of the present invention is described in terms of analog logic in which the electrical control signals are either on or off. Digital logic could also be utilized where a high signal would correspond to an on signal in analog logic and a low signal would correspond to an off signal in analog logic.

The combustion gas turbine air compressor discharge pressure in combustion gas turbine 11 is sensed by pressure transducer 83 as is illustrated in FIG. 2. Pressure transducer 83 supplies a signal 84 representative of the combustion gas turbine air compressor discharge pressure to pressure switch 86. The pressure switch 86 supplies an output signal 88, which will be on if the combustion gas turbine air compressor discharge pressure is greater than or equal to 79 psig and which will be off if the combustion gas turbine air compressor discharge pressure is less than 79 psig, as one input to OR gates 89, 91 and 92. Signal 94, which will be on when the vapor pressure in the crude oil surge tank 15 is less than 39 psig, is supplied from pressure switch 93 as a second input to OR gate 91. The output signal 97 from the OR gate 91, which will be on if either signal 94 or signal 88 is on, is supplied as a second input to the OR gate 92. The output signal 98 from OR gate 92, which will be on if either signal 97 or signal 88 is on, is supplied to time delay means 101. The output signal 102 from the time delay means 101 is supplied as one input to AND gate 104. Signal 106, which will be on when the control panel 24 is ready to switch to the crude oil, is supplied as a second input to the AND gate 104. The output signal 108, which will be on only when both signals 102 and 106 are on, is supplied from AND gate 104 to the control panel 24 and gives an indication that the combustion gas turbine 11 can now be switched to crude oil.

Signal 111, which will be on when the combustion gas turbine 11 is not running, is supplied as a second input to OR gate 89. The output signal 113, which will be on if either signal 88 or 111 is on, is supplied from OR gate 89 as a first input to AND gate 116. Signal 114, which will be on if the combustion gas turbine 11 is running, is supplied as a first input to OR gate 118.

The combustion gas turbine air compressor discharge pressure in combustion gas turbine 12 is sensed by pressure transducer 123. Pressure transducer 123 supplies a signal 124 representative of the combustion gas turbine air compressor discharge pressure, to pressure switch 126. The pressure switch 126 supplies an output signal 128, which will be on if the combustion gas turbine air compressor discharge pressure is greater than or equal to 79 psig and which will be off if the combustion gas turbine air compressor discharge pressure is less than 79 psig, as one input to OR gates 129, 131 and 132. Signal 94, which will be on when the vapor pressure in the crude oil surge tank 15 is less than 39 psig, is supplied from pressure switch 93 as a second input to OR gate 131. The output signal 137 from the OR gate 131, which will be on if either signal 94 or signal 128 is on, is supplied as a second input to the OR gate 132. The output signal 138 from OR gate 132, which will be on if either signal 137 or signal 128 is on, is supplied to time delay means 141. The output signal 142 from the time delay means 141 is supplied as one input to AND gate 144. Signal 146, which will be on when the control panel 28 is ready to switch to the crude oil, is supplied as a second input to the AND gate 144. The output signal 148, which will be on only when both signals 142 and 146 are on, is supplied from AND gate 144 to the control panel 28 and gives an indication that the combustion gas turbine 12 can now be switched to crude oil.

Signal 151, which will be on when the combustion gas turbine 12 is not running, is supplied as a second input to OR gate 129. The output signal 153, which will be on if either signal 128 or 151 are on, is supplied from OR gate 129 as a second input to AND gate 116. Signal 154, which will be on if the combustion gas turbine 12 is running, is supplied as a second input to OR gate 118.

The combustion gas turbine air compressor discharge pressure in combustion gas turbine 13 is sensed by pressure transducer 163. Pressure transducer 163 supplies a signal 164, representative of the combustion gas turbine air compressor discharge pressure, to pressure switch 166. The pressure switch 166 supplies an output signal 168, which will be on if the combustion gas turbine air compressor discharge pressure is greater than or equal to 79 psig and which will be off if the combustion gas turbine air compressor discharge pressure is less than 79 psig, as one input to OR gates 169, 171 and 172. Signal 94, which will be on when the vapor pressure in the crude oil surge tank 15 is less than 39 psig, is supplied from pressure switch 93 as a second input to OR gate 171. The output signal 177 from the OR gate 171, which will be on if either signal 94 or signal 168 is on, is supplied as a second input to the OR gate 172. The output signal 178 from OR gate 172, which will be on if either signal 177 or signal 168 is on, is supplied to time delay means 181. The output signal 182 from the time delay means 181 is supplied as one input to AND gate 184. Signal 186, which will be on when the control panel 34 is ready to switch to the crude oil, is supplied as a second input to the AND gate 184. The output signal 188, which will be on only when both signals 182 and 186 are on, is supplied from AND gate 184 to the control panel 34 and gives an indication that the combustion gas turbine 13 can now be switched to crude oil.

Signal 191, which will be on when the combustion gas turbine 13 is not running, is supplied as a second input to OR gate 169. The output signal 193, which will be on if either signal 168 or 191 is on, is supplied from OR gate 169 as a third one input to AND gate 116. Signal 194, which will be on if the combustion gas turbine 13 is running, is supplied as a third input to OR gate 118.

The output signal 201, which will be on if either signal 114, signal 154 or signal 194 is on, or if any combination of signals 114, 154 and 194 are on, is supplied from OR gate 118 as a fourth input to AND gate 116. The output signal 203, which will be on only if all of the input signals to AND gate 116 are on, is supplied as one input to the switching relay 205. The switching relay 205 is also supplied with two set point signals 207 and 209. Set point signal 207 is representative of 78 psig. Set point signal 209 is representative of 39 psig. If signal 203 is on, set point signal 207 will be selected by select relay 205 and will be supplied as signal 211 to pressure controller 213. If signal 203 is off, the set point signal 209 will be selected by select relay 205 and will be supplied as signal 211 to pressure controller 213.

The vapor pressure of the crude oil in the crude oil surge tank 15 is measured by means of pressure transducer 215. Signal 218, representative of the vapor pressure of the crude oil in the crude oil surge tank 15 is transmitted by pressure transducer 215 to pressure controller 213 and to pressure switch 93. If signal 218 indicates that the vapor pressure of the crude oil is equal to or less than 39 psig then signal 94 from pressure switch 93 will be on. If the signal 218 indicates that the vapor pressure of the crude oil is greater than 39 psig then signal 94, which is supplied by pressure switch 93, will be off.

Pressure controller 213 compares signal 211 and signal 218 and generates signal 221 responsive to the difference between signals 218 and 211. Signal 221 is supplied as a control signal to pneumatic control valve 222 which is located in conduit means 224. Light hydrocarbons are vented from the crude oil in the crude oil surge tank 15 through conduit means 224. The vapor pressure of the crude oil is maintained at a desired level by manipulating pneumatic control valve 222 in response to signal 221. If set point 207 has been selected then the vapor pressure of the crude oil will be maintained at 78 psig. If the set point signal 209 has been selected then the vapor pressure of the crude oil will be maintained at 39 psig.

The system illustrated in FIG. 3 is operated so as to maximize the amount of time that the crude oil can be used as a fuel supply for the combustion gas turbines 11, 12 and 13 while minimizing the venting of light hydrocarbons from the crude oil surge tank 15 through conduit means 224. If all of the combustion gas turbines 11, 12 and 13 are initially off, then signals 114, 154 and 194 will be off and the output signal 201 from the OR gate 118 will be off. This will force the output signal 203 from AND gate 116 to an off condition and the set point signal 209 representative of 39 psig will be selected by the select relay 205 and will be provided as set point signal 211 to pressure controller 213. The vapor pressure of the crude oil in the crude oil surge tank 15 will be held at 39 psig in response to the set point signal 211. This selection of the low set point signal 209 when all of the combustion gas turbines 11, 12 and 13 are off allows a more rapid switch to crude oil fuel when restarting the combustion gas turbines 11 and 13, thus conserving diesel fuel.

When it is desired to start either one, two or all of the combustion gas turbines 11, 12 and 13, diesel fuel is supplied to the diesel starter 43, 44 and 45 associated with the particular combustion gas turbine which is being started. The following description of the start-up and operating procedures for the combustion gas turbines 11, 12 and 13 is described in terms of only one combustion gas turbine but is applicable to all the combustion gas turbines illustrated.

When it is desired to start combustion gas turbine 11, diesel fuel is supplied to diesel starter 43 by opening control valve 59. In this preferred embodiment of the invention control valve 59 is opened by hand but automatic control of control valve 59 could be implemented if desired. Once the combustion gas turbine 11 has reached a desired speed, such that the combustion gas turbine air compressor discharge pressure is at a minimum level, the crude oil fuel is supplied to the combustion gas turbine 11 through conduit means 21 by opening pneumatic control valve 22. If the vapor pressure in the crude oil surge tank is not at 39 psig then diesel fuel will be supplied to the gas combustion turbine 11 through conduit means 51 by opening control valve 53 while maintaining control valve 22 in a closed position. Diesel fuel will continue to be supplied to the combustion gas turbine 11 until such time as the crude oil surge tank vapor pressure has been reduced to 39 psig or the combustion gas turbine air compressor discharge pressure has reached 79 psig. If either of these events occur, then the combustion gas turbine 11 is automatically switched from diesel to crude oil fuel.

During the startup procedure for combustion gas turbine 11, if the crude oil surge vapor pressure is not at 39 psig, then signal 94 from pressure switch 93 will be off. In like manner, because the combustion gas turbine air compressor discharge pressure measured by pressure transducer 83 will be less than 79 psig, signal 88 from pressure switch 86 will be off. Thus, the output signal 97 from the OR gate 91 will be off and the output signal 98 from the OR gate 92 will be off. Signal 102 from time delay means 101 will be off and signal 108 from AND gate 104 will be off indicating that it is not permissible to switch to crude oil fuel.

When the vapor pressure of the crude oil in the crude oil surge tank 15 is at 39 psig, then the signal 94 from the pressure switch 93 will be on, thus causing signal 97, signal 98, and signal 102 to be on. The time delay 101 is provided to allow the vapor pressure of the crude oil fuel in the circulating fuel system to reach equilibrium before signal 102 goes on.

Signal 106 will be on when the operator of the control panel 24 is ready to switch to crude oil fuel. When both signal 106 and 102 are on, signal 108 will be on indicating that it is permissible to switch to crude oil fuel. This is accomplished by opening pneumatic control valve 22 and closing pneumatic control valve 53 in response to control signals 23 and 54 respectively. The vapor pressure of the crude oil in the crude oil surge tank 15 will be maintained at 39 psig until such time as all of the combustion gas turbines 11, 12 and 13 which are running are operating at a combustion gas turbine air compressor discharge pressure of 79 psig. When this condition occurs all of the inputs to the AND gate 116 will be on and signal 203 will be on. Select relay 205 will thus select set point 207 which is representative of 78 psig and the vapor pressure of the crude oil in the crude oil surge tank will be allowed to rise to 78 psig. The signal 94 from pressure switch 93 will thus be off as the vapor pressure of the crude oil rises above 39 psig. However, the signal 88 from pressure switch 86 will be on because the combustion gas turbine air compressor discharge pressure as sensed by pressure sensor 83 is greater than or equal to 79 psig. Because of this, signal 97 will be on thus causing signal 102 to be on. When signal 106 goes on indicating that the operator is ready to switch to crude oil fuel then signal 108 from AND gate 104 will be on indicating that it is still permissible to operate the combustion gas turbines on crude oil fuel.

While the vapor pressure of the crude oil in the crude fuel oil surge tank 15 is being held at 78 psig, if one of the combustion gas turbines is operating at a combustion gas turbine air compressor discharge pressure of less than 79 psig, then at least one of the inputs to AND gate 116 will be low causing the output signal 203 from AND gate 116 to be off. This will cause the vapor pressure of the crude oil to be changed to 39 psig. While the vapor pressure of the crude oil is being changed from 78 psig to 39 psig the particular combustion gas turbine which is running at an air compressor discharge pressure of less than 79 psig will be operated on diesel. When the vapor pressure of the crude oil has reached a pressure of 39 psig signal 94 from pressure switch 93 will go on, thus once again indicating that it is permissible to switch the combustion gas turbine that is operating at a vapor pressure of less than 79 psig to crude oil fuel.

The control system of the present invention allows crude oil to be utilized as a fuel to the combustion gas turbines 11, 12 and 13 at any time when the combustion gas turbine air compressor discharge pressure is 79 psig or greater. Crude oil is also used as a fuel for the combustion gas turbines 11, 12 and 13 when the vapor pressure of the crude oil is 39 psig. Only when the combustion gas turbines 11, 12 or 13 are operating at a combustion gas turbine air compressor discharge pressure of less than 79 psig and the crude oil is at a vapor pressure of greater than 39 psig will operation of the combustion gas turbines on diesel fuel be required. In this manner use of the crude oil as fuel for the combustion gas turbines is maximized while still preventing flashing of the crude oil fuel at the inlet of the combustion gas turbine burner nozzles. At the same time the venting of light hydrocarbons from the crude oil surge tank 15 is minimized to minimize economic loss caused by this venting.

The invention has been described in terms of its presently preferred embodiment as is illustrated in FIG. 3. Many different logic configurations and control configurations are possible which would perform the functions required of the logic and control configurations shown in FIG. 3. This FIGURE is illustrative of a particular control and logic configuration which will perform the required functions.

Specific components which are available commercially and which can be used in the practice of the invention as illustrated in FIG. 3 are as follows:

OR gates 89, 91, 92, 118, 129, 131, 132, 169, 171 and 172: 74LS32, National Semiconductor; Santa Clara, California.
AND gate 104, 144, 184: 74LS08, National Semiconductor; Santa Clara, California.
AND gate 116: 74LS21, National Semiconductor; Santa Clara, California
Time delay means 101, 141, 181: Time Delay Relay, CG Series; Eagle Signal; Davenport, Iowa.

Pressure transducers 83, 123, 163 and 215; pressure switches 86, 126, 166, and 93; pressure controller 213; switching relay 205; pneumatic control valves 22, 53, 26, 63, 32, 72, and 222; control valves 59, 69 and 79; are each well known, commercially available control components such as are described at length in Perry's Chemical Engineers Handbook, 4th Edition, Chapter 22, McGraw-Hill.

For reasons of brevity, conventional equipment such as pumps, additional measurement-control devices, etc. have not been included in the above description as they play no part in the explanation of the invention.

While the invention has been described in terms of the presently preferred embodiments, reasonable variations and modifications are possible by those skilled in the art, within the scope of the described invention and the appended claims. Such variations as varying the number of gas turbines in the system, varying the logic elements or configuration, varying the control elements or control configuration, and varying the supplemental fuel used is within the scope of the present invention.

That which is claimed is:

1. A method for supplying fuel to a combustion gas turbine, where a crude oil fuel and a standby fuel are available as alternative fuels for said combustion gas turbine, comprising the steps of:
   supplying said crude oil fuel to said combustion gas turbine when the vapor pressure of said crude oil fuel is equal to or less than the air compressor discharge pressure for said combustion gas turbine; and
   supplying said standby fuel to said combustion gas turbine when the vapor pressure of said crude oil fuel is greater than said air compressor discharge pressure for said combustion gas turbine.

2. A method in accordance with claim 1 wherein said combustion gas turbine drives a pumping means being utilized to raise the pressure in a pipeline through which crude oil is flowing and wherein said crude oil flowing through said pipeline is used as said crude oil fuel for said combustion gas turbine.

3. A method for supplying fuel to a combustion gas turbine, where a crude oil fuel and a standby fuel are available as alternative fuels for said combustion gas turbine, comprising the steps of:
   establishing a first signal representative of substantially the normal operating combustion gas turbine air compressor discharge pressure;
   establishing a second signal representative of substantially the minimum operating said combustion gas turbine air compressor discharge pressure;
   establishing a third signal representative of said combustion gas turbine air compressor discharge pressure;
   establishing a fourth signal representative of the actual vapor pressure of said crude oil fuel;
   maintaining the vapor pressure of said crude oil fuel at a level equal to or slightly less than the pressure represented by said first signal if said third signal indicates that said combustion gas turbine air compressor discharge pressure is greater than or equal to the pressure represented by said first signal;
   maintaining the vapor pressure of said crude oil fuel at a level equal to or slightly less than the pressure represented by said second signal if said third signal indicates that said combustion gas turbine air compressor discharge pressure is less than the pressure represented by said first signal;
   supplying said crude oil fuel to said gas turbine if said third signal indicates that said combustion gas turbine air compressor discharge pressure is greater than or equal to the pressure represented by said first signal;
   supplying said crude oil fuel to said combustion gas turbine if said third signal indicates that said combustion gas turbine air compressor discharge pressure is less than said first signal and said fourth signal indicates that the vapor pressure of said crude oil fuel is less than or equal to the pressure represented by said signal; and supplying said standby fuel to said combustion gas turbine if said third signal indicates that said combustion gas turbine air compressor discharge pressure is less than said first signal and said fourth signal indicates that the vapor pressure of said crude oil fuel is greater than the pressure represented by said second signal.

4. A method in accordance with claim 3 wherein said step of maintaining the vapor pressure of said crude oil fuel at a level equal to or slightly less than the pressure represented by said first signal if said third signal indicates that said combustion gas turbine air compressor discharge pressure is greater than or equal to the pressure represented by said first signal comprises:

comparing said first signal and said fourth signal and establishing a fifth signal responsive to the difference between said first signal and said fourth signal; and venting light hydrocarbons from said crude oil fuel in response to said fifth signal to thereby maintain the vapor pressure of said crude oil fuel at a level equal to or slightly less than the pressure represented by said first signal.

5. A method in accordance with claim 4 wherein said step of maintaining the vapor pressure of said crude oil fuel at a level equal to or slightly less than the pressure represented by said second signal if said third signal indicates that said combustion gas turbine air compressor discharge pressure is less than the pressure represented by said first signal comprises:

comparing said second signal and said fourth signal and establishing a sixth signal responsive to the difference between said second signal and said fourth signal; and venting light hydrocarbons from said crude oil fuel in response to said sixth signal to thereby maintain the vapor pressure of said crude oil fuel at a level equal to or slightly less than the pressure represented by said second signal.

6. A method in accordance with claim 5 additionally comprising the steps of:

establishing a seventh signal representative of a combustion gas turbine not running signal; and maintaining the vapor pressure of said crude oil fuel at a level equal to or slightly less than the pressure represented by said second signal if said seventh signal indicates that said combustion gas turbine is not running.

7. A method in accordance with claim 6 wherein said step of maintaining the vapor pressure of said crude oil fuel at a level equal to or slightly less than the pressure represented by said second signal if said seventh signal indicates that said combustion gas turbine is not running comprises venting light hydrocarbons from said crude oil fuel in response to said sixth signal to thereby maintain the vapor pressure of said crude oil fuel at a level equal to or slightly less than the pressure represented by said second signal.

8. A method in accordance with claim 7 wherein said combustion gas turbine drives a pumping means being utilized to raise the pressure in a pipeline through which crude oil is flowing and wherein said crude oil flowing through said pipeline is used as said crude oil fuel for said combustion gas turbine.

9. A method for supplying fuel to a first combustion gas turbine and a second combustion gas turbine, where a crude oil fuel and a standby fuel are available as alternative fuels for said first combustion gas turbine and said second combustion gas turbine, comprising the steps of:

establishing a first signal representative of substantially the normal operating air compressor discharge pressure for said first combustion gas turbine and said second combustion gas turbine;

establishing a second signal representative of substantially the minimum operating air compressor discharge pressure for said first combustion gas turbine and said second combustion gas turbine;

establishing a third signal representative of the air compressor discharge pressure for said first combustion gas turbine;

establishing a fourth signal representative of the air compressor discharge pressure for said second combustion gas turbine;

establishing a fifth signal representative of the vapor pressure of said crude oil fuel;

maintaining the vapor pressure of said crude oil fuel at a level equal to or slightly less than the pressure represented by said first signal if said third signal indicates that the air compressor discharge pressure for said first combustion gas turbine is greater than or equal to the pressure represented by said first signal and said fourth signal indicates that the air compressor discharge pressure for said second combustion gas turbine is greater than or equal to the pressure represented by said first signal;

maintaining the vapor pressure of said crude oil fuel at a level equal to or slightly less than the pressure represented by said second signal if said third signal indicates that the air compressor discharge pressure for said first combustion gas turbine is less than the pressure represented by said first signal or said fourth signal indicates that the air compressor discharge pressure for said second combustion gas turbine is less than the pressure represented by said first signal;

supplying said crude oil fuel to said first combustion gas turbine if said third signal indicates that the air compressor discharge pressure for said first combustion gas turbine is greater than or equal to the pressure represented by said first signal;

supplying said crude oil fuel to said second combustion gas turbine if said fourth signal indicates that the air compressor discharge pressure for said second combustion gas turbine is greater than or equal to the pressure represented by said first signal;

supplying said crude oil fuel to said first combustion gas turbine if said third signal indicates that the air compressor discharge pressure of said first combustion gas turbine is less than said first signal and said fifth signal indicates that the vapor pressure of said crude oil fuel is less than or equal to the pressure represented by said second signal;

supplying said crude oil fuel to said second combustion gas turbine if said fourth signal indicates that the air compressor discharge pressure for said second combustion gas turbine is less than said first signal and said fifth signal indicates that the vapor pressure of said crude oil fuel is less than or equal to the vapor pressure represented by said second signal;

supplying said standby fuel to said first combustion gas turbine if said third signal indicates that the air compressor discharge pressure for said first combustion gas turbine is less than said first signal and said fifth signal indicates that the vapor pressure of said crude oil fuel is greater than the pressure represented by said second signal; and supplying said standby fuel to said second combustion gas turbine if said fourth signal indicates that the air compressor discharge pressure for said second combustion gas turbine is less than said first signal and said fifth signal indicates that the vapor pressure of said crude oil fuel oil is greater than the pressure represented by said second signal.

10. A method in accordance with claim 9 wherein said step of maintaining the vapor pressure of said crude oil fuel at a level equal to or slightly less than the pressure represented by said first signal if said third signal indicates the air compressor discharge pressure for said first combustion gas turbine is greater than or equal to the pressure represented by said first signal and said fourth signal indicates that the air compressor discharge pressure for said second combustion gas turbine is greater than or equal to the pressure represented by said first signal comprises:

comparing said first signal and said fifth signal and establishing a sixth signal responsive to the difference between said first signal and said fifth signal; and venting light hydrocarbons from said crude oil fuel in response to said sixth signal equal to thereby maintain the vapor pressure of said crude oil fuel at a level equal to or slightly less than the pressure represented by said first signal.

11. A method in accordance with claim 10 wherein said step of maintaining the vapor pressure of said crude oil fuel at a level equal to or slightly less than the pressure represented by said second signal if said third signal indicates that the air compressor discharge pressure of said first combustion gas turbine is less than the pressure represented by said first signal or said fourth signal indicates that the air compressor discharge pressure of said second combustion gas turbine is less than the pressure represented by said first signal comprises:

comparing said second signal and said fifth signal and establishing a seventh signal responsive to the difference between said second signal and said fifth signal; and venting light hydrocarbons from said crude oil fuel in response to said seventh signal to thereby maintain the vapor pressure of said crude oil fuel at a level equal to or slightly less than the pressure represented by said second signal.

12. A method in accordance with claim 11 comprising the additional steps of:

establishing an eighth signal representative of a first combustion gas turbine not running signal;

establishing a ninth signal representative of a second combustion gas turbine not running signal;

maintaining the vapor pressure of said crude oil fuel at a level equal to or slightly less than the pressure represented by said first signal if said third signal indicates that the air compressor discharge pressure for said first combustion gas turbine is greater than or equal to the pressure represented by said first signal and said ninth signal indicates that said second combustion gas turbine is not running;

maintaining the vapor pressure of said crude oil fuel at a level equal to or slightly less than the pressure represented by said first signal if said fourth signal indicates that the air compressor discharge pressure for said second combustion gas turbine is greater than or equal to the pressure represented by said first signal and said eighth signal indicates that said first combustion gas turbine is not running; and maintaining the vapor pressure of said crude oil fuel at a level equal to or slightly less than the pressure represented by said second signal if said eighth signal indicates that said first combustion gas turbine is not running and said ninth signal indicates that said second combustion gas turbine is not running.

13. A method in accordance with claim 12 wherein said step of maintaining the vapor pressure of said crude oil fuel at a level equal to or slightly less than the pressure represented by said first signal if said third signal indicates that the air compressor discharge pressure for said first combustion gas turbine is greater than or equal to the pressure represented by said first signal and said ninth signal indicates that said second combustion gas turbine is not running and said step of maintaining the vapor pressure of said crude fuel oil at a level equal to or slightly less than the pressure represented by said first signal if said fourth signal indicates that the air compressor discharge pressure for said second combustion gas turbine is greater than or equal to the pressure represented by said first signal and said eighth signal indicates that said first combustion gas turbine is not running comprises venting light hydrocarbons from said crude oil fuel in response to said sixth signal to thereby maintain the vapor pressure of said crude oil fuel at a level equal to or slightly less than the pressure represented by said first signal.

14. A method in accordance with claim 13 wherein said step of maintaining the vapor pressure of said crude oil fuel at a level equal to or slightly less than the pressure represented by said second signal if said eighth signal indicates that said first combustion gas turbine is not running and said ninth signal indicates that said second combustion gas turbine is not running comprises venting light hydrocarbons from said crude oil fuel in response to said seventh signal to thereby maintain the vapor pressure of said crude oil fuel at a level equal to or slightly less than the pressure represented by said second signal.

15. A method in accordance with claim 14 wherein said first and second combustion gas turbines drive pumping means being utilized to raise the pressure in a pipeline through which crude oil is flowing and wherein said crude oil flowing through said pipeline is used as said crude oil fuel for said first and second combustion gas turbines.

16. Apparatus for supplying fuel oil to a combustion gas turbine means, where a crude oil fuel and a standby fuel are available as alternative fuels for said gas turbine means, comprising:

means for establishing a first signal representative of the actual vapor pressure of said crude oil fuel;

means for establishing a second signal representative of the air compressor discharge pressure for said combustion gas turbine means;

means for supplying said crude oil fuel to said combustion gas turbine means when the pressure represented by said first signal is equal to or less than the pressure represented by said second signal; and means for supplying said standby fuel to said combustion gas turbine means when the pressure represented by said first signal if greater than the pressure represented by said second signal.

17. Apparatus in accordance with claim 16 additionally comprising:

a first crude oil pipeline;
a second crude oil pipeline;
a pumping station;
means for supplying crude oil from said first crude oil pipeline through said pumping station to said second crude oil pipeline;
a crude oil surge tank; and
means for supplying crude oil from said first crude oil pipeline to said crude oil surge tank, said crude oil in said crude oil surge tank being used as said crude oil fuel for said combustion gas turbine, said combustion gas turbine driving pumping means in said pumping station.

18. Apparatus for supplying fuel to a combustion gas turbine means, where a crude oil fuel and a standby fuel are available as alternative fuels for said gas turbine means, comprising:
means for establishing a first signal representative of substantially the normal operating air compressor discharge pressure for said combustion gas turbine means;
means for establishing a second signal representative of substantially the minimum operating air compressor discharge pressure for said combustion gas turbine means;
means for establishing a third signal representative of the air compressor discharge pressure for said combustion gas turbine means;
means for establishing a fourth signal representative of the vapor pressure of said crude oil fuel;
means for establishing a fifth signal which has a first value when the pressure represented by said third signal is greater than or equal to the pressure represented by said first signal and which has a second value when the pressure represented by said third signal is less than the pressure represented by said first signal;
means for maintaining the vapor pressure of said crude oil fuel at a level equal to or slightly less than the pressure represented by said first signal if said fifth signal has said first value;
means for maintaining the vapor pressure of said crude oil fuel at a level equal to or slightly less than the pressure represented by said second signal if said fifth signal has said second value;
means for supplying said crude oil fuel to said combustion gas turbine means if said fifth signal has said first value;
means for supplying said crude oil fuel to said combustion gas turbine means if said fifth signal has said second value and if the pressure represented by said fourth signal is less than or equal to the pressure represented by said second signal; and
means for supplying said standby fuel to said combustion gas turbine means if said fifth signal has said second value and if the pressure represented by said fourth signal is greater than the pressure represented by said second signal.

19. Apparatus in accordance with claim 18 wherein said means for establishing said fifth signal comprises a pressure switch.

20. Apparatus in accordance with claim 18 wherein said means for maintaining the vapor pressure of said crude oil fuel at a level equal to or slightly less than the pressure represented by said first signal if said fifth signal has said first value and said means for maintaining the vapor pressure of said crude oil fuel at a level equal to or slightly less than the pressure represented by said second signal if said fifth signal has said second value comprises:
means for comparing at least two input signals and establishing at least one output signal responsive to the difference between said two input signals;
a switching relay means;
means for supplying said first signal to said switching relay means;
means for supplying said second signal to said switching relay means;
means for supplying said fifth signal to said switching relay means, said switching relay means supplying said first signal to said means for comparing at least two input signals if said fifth signal has said first value and said switching relay means supplying said second signal to said means for comparing at least two input signals if said fifth signal has said second value;
means for supplying said fourth signal to said means for comparing at least two input signals;
means for venting light hydrocarbons from said crude oil fuel;
means for supplying a sixth signal, responsive to the difference between said first signal and said fourth signal, from said means for comparing at least two input signals to said means for venting light hydrocarbons from said crude oil fuel to thereby manipulate said means for venting light hydrocarbons so as to maintain the vapor pressure of said crude oil fuel equal to or slightly less than the pressure represented by said first signal if said fifth signal has said first value; and
means for supplying a seventh signal, responsive to the difference between said second signal and said fourth signal, from said means for comparing at least two input signals to said means for venting light hydrocarbons from said crude oil fuel to thereby manipulate said means for venting light hydrocarbons so as to maintain the vapor pressure of said crude oil fuel at a level equal to or slightly less than the pressure represented by said second signal if said fifth signal has said second value.

21. Apparatus in accordance with claim 20 wherein said means for comparing at least two input signals and for providing at least one output signal responsive to the difference between said two input signals is a proportional-integral controller.

22. Apparatus in accordance with claim 18 additionally comprising means for establishing a sixth signal which has a third value when said combustion gas turbine is not running and which has a fourth value when said combustion gas turbine is running; and
means for maintaining the vapor pressure of said crude oil fuel at a level equal to or slightly less than the pressure represented by said second signal if said sixth signal has said third value.

23. Apparatus in accordance with claim 22 wherein said means for maintaining the vapor pressure of said crude oil fuel at a level equal to or slightly less than the pressure represented by said second signal if said sixth signal has said third value comprises:
means for comparing at least two input signals and establishing at least one output signal responsive to the difference between said two input signals;
a switching relay means;
means for supplying said first signal to said switching relay means;

means for supplying said second signal to said switching relay means;

means for supplying said fifth signal, which will have said second value when said sixth signal has said third value, to said switching relay means, said switching relay means supplying said second signal to said means for comparing at least two input signals when said sixth signal has said third value and said fifth signal has said second value;

means for supplying said fourth signal to said means for comparing at least two input signals;

means for venting light hydrocarbons from said crude oil fuel; and means for supplying a seventh signal, responsive to the difference between said second signal and said fourth signal, from said means for comparing at least two input signals to said means for venting light hydrocarbons from said crude oil fuel to thereby manipulate said means for venting light hydrocarbons so as to maintain the vapor pressure of said crude oil fuel at a level equal to or slightly less than the pressure represented by said second signal when said sixth signal has said third value and said fifth signal has said second value.

24. Apparatus in accordance with claim 23 wherein said means for comparing at least two input signals and for providing at least one output signal responsive to the difference between said two input signals is a proportional-integral controller.

25. Apparatus in accordance with claim 18 additionally comprising:

a first crude oil pipeline;
a second crude oil pipeline;
a pumping station;
means for supplying crude oil from said first crude oil pipeline through said pumping station to said second crude oil pipeline;
a crude oil surge tank; and
means for supplying crude oil from said first crude oil pipeline to said crude oil surge tank, said crude oil in said crude oil surge tank being used as said crude oil fuel for said combustion gas turbine, said combustion gas turbine driving pumping means in said pumping station, said light hydrocarbons in said crude oil being vented from said crude oil surge tank.

26. Apparatus for supplying fuel to a first combustion gas turbine and a second combustion gas turbine, where a crude oil fuel and a standby fuel are available as alternative fuels for said first combustion gas turbine and said second combustion gas turbine, comprising:

means for establishing a first signal representative of substantially the normal operating air compressor discharge pressure for said first combustion gas turbine and said second combustion gas turbine;

means for establishing a second signal representative of substantially the minimum operating air compressor discharge pressure for said first combustion gas turbine and said second combustion gas turbine;

means for establishing a third signal representative of the air compressor discharge pressure for said first combustion gas turbine;

means for establishing a fourth signal representative of the air compressor discharge pressure for said second combustion gas turbine;

means for establishing a fifth signal representative of the vapor pressure of said crude oil fuel;

means for establishing a sixth signal which has a first value when the pressure represented by said third signal is greater than or equal to the pressure represented by said first signal and which has a second value when the pressure represented by said third signal is less than the pressure represented by said first signal;

means for establishing a seventh signal which has a third value when the pressure represented by said fourth signal is greater than or equal to the pressure represented by said first signal and which has a fourth value when the pressure represented by said fourth signal is less than the pressure represented by said first signal;

means for maintaining the vapor pressure of said crude oil fuel at a level equal to or slightly less than the pressure represented by said first signal if said sixth signal has said first value and if said seventh signal has said third value;

means for maintaining the vapor pressure of said crude oil fuel at a level equal to or slightly less than the pressure represented by said second signal if said sixth signal has said second value or if said seventh signal has said fourth value;

means for supplying crude oil fuel to said first combustion gas turbine if said sixth signal has said first value;

means for supplying said crude oil fuel to said second combustion gas turbine if said seventh signal has said third value;

means for supplying said crude oil fuel to said first combustion gas turbine if said sixth signal has said second value and the pressure represented by said fifth signal is less than or equal to the pressure represented by said second signal;

means for supplying said crude oil fuel to said second combustion gas turbine if said seventh signal has said fourth value and the pressure represented by said fifth signal is less than or equal to the pressure represented by said second signal;

means for supplying said standby fuel to said first combustion gas turbine if said sixth signal has said second value and the pressure represented by said fifth signal is greater than the pressure represented by said second signal; and means for supplying said standby fuel to said second combustion gas turbine if said seventh signal has said fourth value and the pressure represented by said fifth signal is greater than the pressure represented by said second signal.

27. Apparatus in accordance with claim 26 wherein said means for establishing said sixth signal is a first pressure switch means and said means for establishing said seventh signal is a second pressure switch means.

28. Apparatus in accordance with claim 26 wherein said means for maintaining the vapor pressure of said crude oil fuel at a level equal to or slightly less than the pressure represented by said first signal if said sixth signal has said first value and said seventh signal has said third value and said means for maintaining the vapor pressure of said crude fuel oil at a level equal to or slightly less than the pressure represented by said second signal if said sixth signal has said second value and said seventh signal has said fourth value comprises:

means for comparing at least two input signals and establishing at least one output signal responsive to the difference between said two input signals;

a switching relay means;

means for supplying said first signal to said switching relay means;

means for supplying said second signal to said switching relay means;

means for establishing an eighth signal which has a fifth value when said sixth signal has said first value and when said seventh signal has said third value and which has a sixth value when said sixth signal has said second value or said seventh signal has said fourth value;

means for supplying said sixth signal and said seventh signal to said means for establishing said eighth signal;

means for supplying said eighth signal to said switching relay means, said switching relay means supplying said first signal to said means for comparing at least two input signals if said eighth signal has said fifth value and said switching relay means supplying said second signal to said means for comparing at least two input signals if said eighth signal has said sixth value;

means for supplying said fourth signal to said means for comparing at least two input signals;

means for venting light hydrocarbons from said crude oil fuel;

means for supplying a ninth signal, responsive to the difference between said first signal and said fourth signal, to said means for venting light hydrocarbons from said crude oil fuel to thereby manipulate said means for venting light hydrocarbons so as to maintain the vapor pressure of said crude oil fuel equal to or slightly less than the pressure represented by said first signal if said eighth signal has said fifth value; and means for supplying a tenth signal, responsive to the difference between said second signal and said fourth signal, from said means for comparing at least two input signals to said means for venting light hydrocarbons from said crude oil fuel to thereby manipulate said means for venting light hydrocarbons so as to maintain the vapor pressure of said crude oil fuel at a level equal to or slightly less than the pressure represented by said second signal if said eighth signal has said sixth value.

29. Apparatus in accordance with claim 28 wherein said means for comparing at least two input signals and for providing at least one output signal responsive to the difference between said two input signals is a proportional-integral controller and said means for establishing said eighth signal is an AND gate.

30. Apparatus in accordance with claim 26 additionally comprising means for establishing an eighth signal which has a fifth value when said first combustion gas turbine is not running and which has a sixth value when said first combustion gas turbine is running;

means for establishing a ninth signal which has a seventh value when said second combustion gas turbine is not running and which has an eighth value when said second combustion gas turbine is running;

means for maintaining the vapor pressure of said crude oil fuel at a level equal to or slightly less than the pressure represented by said first signal if said sixth signal has said first value and said ninth signal has said seventh value;

means for maintaining the vapor pressure of said crude oil fuel at a level equal to or slightly less than the pressure represented by said first signal if said seventh signal has said third value and said eighth signal has said fifth value; and means for maintaining the vapor pressure of said crude oil fuel at a level equal to or slightly less than the pressure represented by said second signal if said eighth signal has said fifth value and said ninth signal has said seventh value.

31. Apparatus in accordance with claim 30 wherein said means for maintaining the vapor pressure of said crude oil fuel at a level equal to or slightly less than the pressure represented by said first signal if said sixth signal has said first value and said ninth signal has said seventh value, said means for maintaining the vapor pressure of said crude oil fuel at a level equal to or slightly less than the pressure represented by said first signal if said seventh signal has said third value and said eighth signal has said fifth value, and said means for maintaining the vapor pressure of said crude oil fuel at a level equal to or slightly less than the pressure represented by said second signal if said eighth signal has said fifth value and said ninth signal has said seventh value comprises:

means for comparing at least two input signals and establishing at least one output signal responsive to the difference between said two input signals;

a switching relay means;

means for supplying said first signal to said switching relay means;

means for supplying said second signal to said switching relay means;

means for establishing a tenth signal which has a ninth value when said eighth signal has said fifth value or said ninth signal has said seventh value and which has a tenth value when said eighth signal has said sixth value and said ninth signal has said eighth value;

means for supplying said eighth signal and said ninth signal to said means for establishing said tenth signal;

means for establishing an eleventh signal which has an eleventh value when said sixth signal has said first value, said seventh signal has said third value and said tenth signal has said ninth value and which has a twelfth value when said sixth signal has said second value, said seventh signal has said third value or said tenth signal has said tenth value;

means for supplying said sixth, said seventh and said tenth signals to said means for establishing said eleventh signals;

means for supplying said eleventh signal to said switching relay means, said switching relay means supplying said first signal to said means for comparing at least two input signals if said eleventh signal has said eleventh value and said switching relay means supplying said second signal to said means for comparing at least two input signals if said eleventh signal has said twelfth value;

means for supplying said fifth signal to said means for comparing at least two input signals;

means for venting light hydrocarbons from said crude oil fuel;

means for supplying a twelfth signal, responsive to the difference between said first signal and said fifth signal to said means for venting light hydrocarbons from said crude oil fuel to thereby manipulate said means for venting light hydrocarbons so as to maintain the vapor pressure of said crude oil fuel equal to or slightly less than the pressure represented by said first signal if said eleventh signal has said eleventh value; and means for supplying a thirteenth signal, responsive to the difference between said second signal and said fifth signal, from said means for comparing at least two input signals to said means for venting light hydrocarbons from said crude oil fuel to thereby manipulate said means for venting light hydrocarbons so as to maintain the vapor pressure of said crude oil fuel at a level equal to or slightly less than the pressure represented by said second signal if said eleventh signal has said twelfth value.

32. Apparatus in accordance with claim 31 wherein said means for comparing at least two input signals and for providing at least one output signal responsive to the difference between said two input signals is a proportional-integral controller, said means for establishing said tenth signal is an OR gate, and said means for establishing said eleventh signal is an AND gate.

33. Apparatus in accordance with claim 26 additionally comprising:

a first crude oil pipeline;

a second crude oil pipeline;

a pumping station;

means for supplying crude oil from said first crude oil pipeline through said pumping station to said second crude oil pipeline;

a crude oil surge tank; and means for supplying crude oil from said first crude oil pipeline to said crude oil surge tank, said crude oil in said crude oil surge tank being used as said crude oil fuel for said first and second combustion gas turbines, said first and second combustion gas turbines driving pumping means in said pumping station, said light hydrocarbons in said crude oil being vented from said crude oil surge tank.

* * * * *